(12) United States Patent
Mohammed et al.

(10) Patent No.: US 8,973,050 B2
(45) Date of Patent: Mar. 3, 2015

(54) FREE-WHEEL SYSTEM

(75) Inventors: Saleem S. Mohammed, Chennai (IN); Vijay A. Senthil, Chennai (IN); Syed Mohasin Zaki, Chennai (IN); Shafiq Kassam, Lewisville, TX (US); Vinod Krishnan Surianarayanan, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 367 days.

(21) Appl. No.: 13/053,345

(22) Filed: Mar. 22, 2011

(65) Prior Publication Data
US 2012/0246683 A1  Sep. 27, 2012

(51) Int. Cl.
*G06F 3/00* (2006.01)
*H04N 5/44* (2011.01)
*H04N 21/422* (2011.01)
*G06F 3/0485* (2013.01)
*H04N 21/81* (2011.01)

(52) U.S. Cl.
CPC ....... *H04N 5/4403* (2013.01); *H04N 21/42226* (2013.01); *G06F 3/0485* (2013.01); *H04N 21/4222* (2013.01); *H04N 21/8186* (2013.01); *H04N 2005/4435* (2013.01); *H04N 2005/4444* (2013.01)

USPC ............................................. 725/52; 715/704

(58) Field of Classification Search
None
See application file for complete search history.

(56) References Cited

U.S. PATENT DOCUMENTS

| | | | |
|---|---|---|---|
| 7,024,677 B1 * | 4/2006 | Snyder et al. | 725/86 |
| 7,918,733 B2 * | 4/2011 | Zalewski et al. | 463/39 |
| 8,190,785 B2 * | 5/2012 | Hill et al. | 710/8 |
| 2004/0041827 A1 * | 3/2004 | Bischof et al. | 345/704 |
| 2004/0113892 A1 * | 6/2004 | Mears et al. | 345/172 |
| 2005/0097618 A1 * | 5/2005 | Arling et al. | 725/114 |
| 2006/0010420 A1 * | 1/2006 | Peterson et al. | 717/106 |
| 2008/0168520 A1 * | 7/2008 | Vanderhoff et al. | 725/131 |
| 2009/0222726 A1 * | 9/2009 | Kintzley | 715/704 |
| 2010/0174678 A1 * | 7/2010 | Massand | 707/610 |
| 2012/0144411 A1 * | 6/2012 | Pham | 725/13 |

* cited by examiner

Primary Examiner — Jason K Lin (57) ABSTRACT

A method including receiving a request to start recording a sequence of navigational inputs to be received by a user device; storing each navigational input of the sequence when each navigational input is received; receiving a request to stop recording the sequence of navigational inputs; stopping the recording of the sequence of navigational inputs; receiving an assignment of a trigger to invoke an execution of the recorded sequence of navigational inputs; storing the assignment of the trigger; identifying when the trigger is received or occurs; and executing the recorded sequence of navigational inputs on the user device based on the identifying.

22 Claims, 8 Drawing Sheets

| PROGRAMMING GUIDE | DATE | | | COMPANY LOGO |
|---|---|---|---|---|
| | 2:30 PM | 3:00 PM | 3:30 PM | 4:00 PM |
| CHANNEL 4 | JUDGE X | JUDGE Y | JUDGE Z | TALK SHOW |
| CHANNEL 5 | SOAP OPERA | SOAP OPERA | | SIT-COM |
| CHANNEL 6 | SOAP OPERA | SOAP OPERA | | TALK SHOW |
| CHANNEL 7 | TALK SHOW | TALK SHOW | | NEWS |
| GUIDE OPTIONS | | | | |

· · ·

| CHANNEL 401 | MOVIE | INVESTIGATIVE REPORTING |
|---|---|---|

FREE-WHEEL SYSTEM

BACKGROUND

Devices typically provide user interfaces to permit users to interact with and navigate through the devices. For example, users may input various commands, via an input component included in the device (e.g., a keypad, etc.) or a separate device (e.g., a mouse, a keyboard, a remote control, etc.), to allow the user to interact with and navigate through the device. In this way, the user is able to use the device and provided with the functionality offered by the device.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

According to an exemplary embodiment, a free-wheel system may permit a user to record a sequence of navigational commands, which may be input into a user device. The free-wheel system may permit the user to edit parameters pertaining to the navigational commands after recording. The free-wheel system may permit the user to assign a trigger to invoke the execution of a particular navigational sequence. For example, the trigger may correspond to an input of the user device (e.g., the user pressing a button) and/or some other event (e.g., a time-based event (e.g., date, day, hour, minute, etc.); a user device event (e.g., when the user device starts up, when the user device shuts down, when an application is launched or closed, etc.)). In this way, the user may use various automated navigational sequences when interacting with the user device. For example, the navigational sequence may include scrolling, searching, navigating through a menu or other graphical user interface, selecting, a series of cursor inputs, etc., as will be described further below, which may otherwise involve multiple inputs to be entered by the user.

According to another exemplary embodiment, the free-wheel system may permit the user to configure a task to be performed by a user device at a particular time or upon the occurrence of an event. For example, the user may configure the free-wheel system to launch an application on a particular date and time, upon the occurrence of an event, such as when the user starts-up his/her user device, a combination thereof, etc., as will be described further below. According to an exemplary implementation, the user may record a sequence of navigational commands to configure the task. According to another exemplary implementation, the free-wheel system may provide the user with a user interface to configure the task.

According to yet another exemplary embodiment, the free-wheel system may provide an interactive virtual user. For example, the interactive virtual user may be invoked to instruct the user with respect to the operation or capabilities of his/her user device, to instruct the user to a service provided by a service provider (e.g., a television service provider, etc.), and/or during the course of other applicable situations. In contrast to existing approaches, in which the user may watch an instructional video or refer to a written manual pertaining to his/her user device, service (e.g., television service, etc.), etc., the free-wheel system may provide the information/instruction to the user by operating the user's user device. The free-wheel system may permit the user to interact with the free-wheel system during a simulation, such as, permitting the user to stop, pause, or replay any portion of the simulation. The interactive virtual user will be described further below.

According to an exemplary embodiment, the free-wheel system may provide a user with various graphical user interfaces to permit the user to select various functions offered by free-wheel system, edit parameters pertaining to automated processes, etc., as further described herein.

Figure 1A:
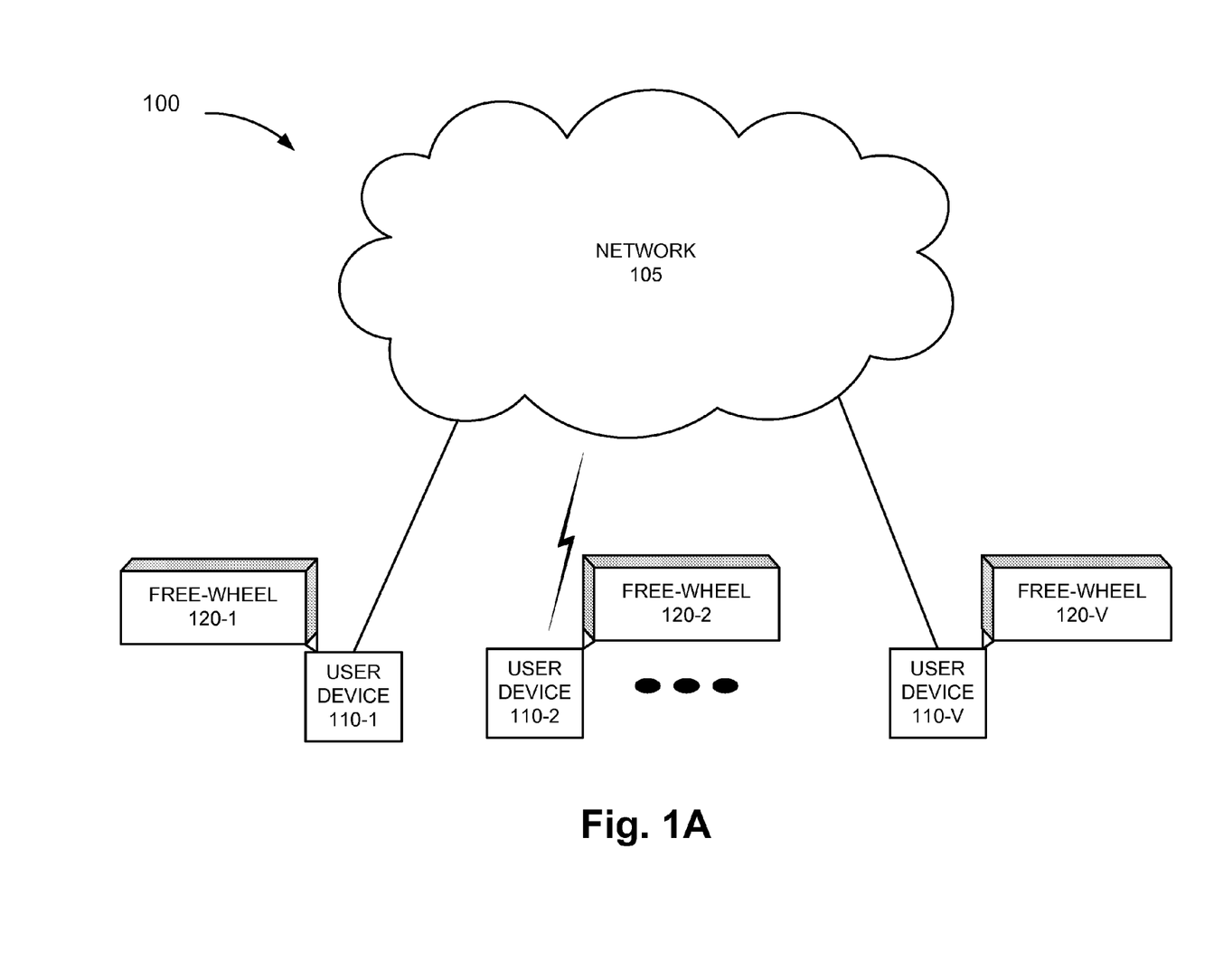
FIG. 1A is a diagram illustrating an exemplary environment in which an exemplary embodiment of a free-wheel system may be implemented.

FIG. 1A is a diagram illustrating an exemplary environment 100 in which an exemplary embodiment of the free-wheel system may be implemented. As illustrated in FIG. 1A, exemplary environment 100 may include a network 105 and user devices 110-1 through 110-V (referred to as user devices 110 or user device 110) that include free-wheel 120-1 through 120-V (referred to as free-wheels 120 or free-wheel 120).

The number of devices and configuration in environment 100 is exemplary and provided for simplicity. According to other embodiments, environment 100 may include additional devices, fewer devices, different devices, and/or differently arranged devices than those illustrated in FIG. 1A. Additionally, or alternatively, environment 100 may not include network 105. Environment 100 may include wired (e.g., electrical, optical) and/or wireless connections among the devices illustrated.

Network 105 may include one or multiple networks of one or multiple types. For example, network 105 may include the Internet, a wide area network, a private network, a public network, an intranet, a local area network, an Internet Protocol (IP) network, a wired network (e.g., an optical network, a cable network, etc.), a wireless network (e.g., a mobile network, a cellular network, a non-cellular network, etc.), etc. According to an exemplary embodiment, network 105 may include a network that distributes or makes available services, such as, for example, television service and Internet service. Although not illustrated, according to such an embodiment, network 105 may include, for example, content distribution devices, content storage devices, application servers, billing devices, security devices, etc.

User device 110 may correspond to various types of user devices. User device 110 may correspond to a stationary device, a portable device, a handheld or palmtop device, or a mobile device. For example, user device 110 may correspond to a computer (e.g., a desktop, a laptop, a palmtop, a tablet, a netbook, etc.), a personal digital assistant (PDA), a personal communication system (PCS) terminal, an iPad™ device, an iPhone™ device, or the like. Alternatively, user device 110 may take the form of a client device, a set-top box, a converter box, a receiver, a tuner, a digibox, or some other type of network interface device. User device 110 may also correspond to multiple devices. For example, user device 110 may take the form of a set-top box, a television remote control, and a television. As a further example, user device 110 may take the form of a set-top box and a mobile device, or a set-top box, a mobile device, and a television, in which the mobile device may be used as a display and/or an input device (e.g., a remote control), and may be communicatively coupled to the set-top box and/or the television or other suitable display.

As further illustrated in FIG. 1A, user device 110 may include free-wheel 120. According to an exemplary implementation, free-wheel 120 may take the form of software (e.g., one or more applications). Depending on the (type of) user device 110, depending on the operating system of user device 110, depending on the application of user device 110 in which the sequence pertains, etc., free-wheel 120 may be implemented as a software machine-readable library. Free-wheel 120 may communicate, interact, etc., with a parent system of user device 110 through inter-process communication (IPC), exported library application programming interface (API) calls, call-back functions, web-service functions (e.g., post, get, etc.), via in-system readable and writable memory, and so forth, as described further below. According to another exemplary implementation, free-wheel 120 may take the form of a software system with its own hardware. By way of example, free-wheel 120 may correspond to a Universal Serial Bus (USB) stick or a dongle, and may have plug-and-play capabilities.

As previously described, according an exemplary embodiment, free-wheel 120 may permit a user to record a sequence of navigational input commands, which may be input into a user device. Free-wheel 120 may permit the user to edit parameters pertaining to the navigational input commands after recording and assign a trigger. Described below are some examples pertaining to this feature.

Figure 1B:
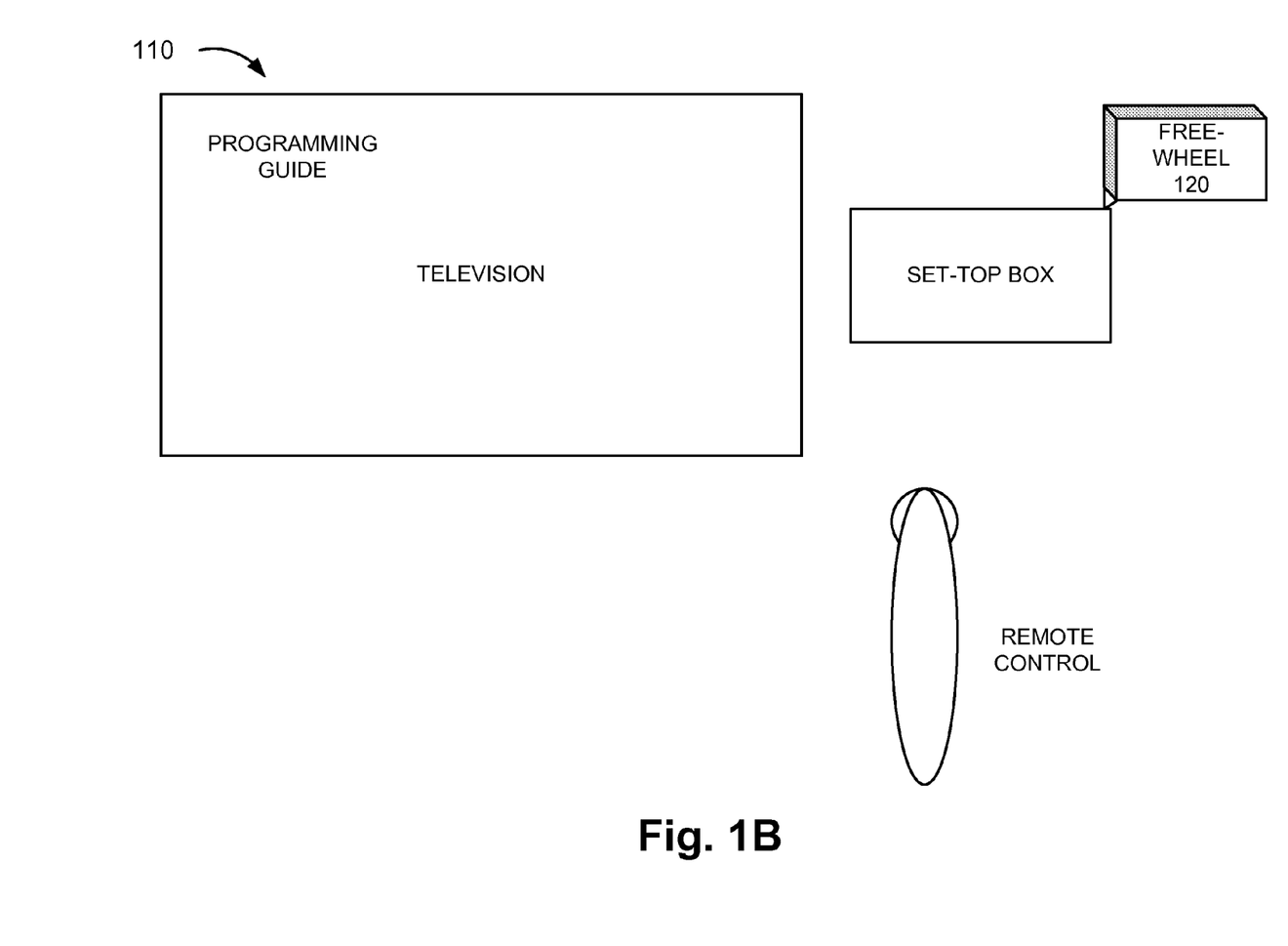
FIG. 1B is a diagram illustrating an exemplary user device that includes the free-wheel system.

In one example, user device 110 includes a television, a set-top box, and a remote control, as illustrated in FIG. 1B. As further illustrated, according to an exemplary embodiment, set-top box may include free-wheel 120. The set-top box may communicate with network 105 (illustrated in FIG. 1A) for providing television service and/or content to the television. According to other implementations, the set-top box may correspond to similar devices, such as a client device, a converter box, a receiver, a tuner, a digibox, or some other similar type of network interface device that provides or facilitates the delivery of television service and/or content to a user, as previously described.

Figure 1C:
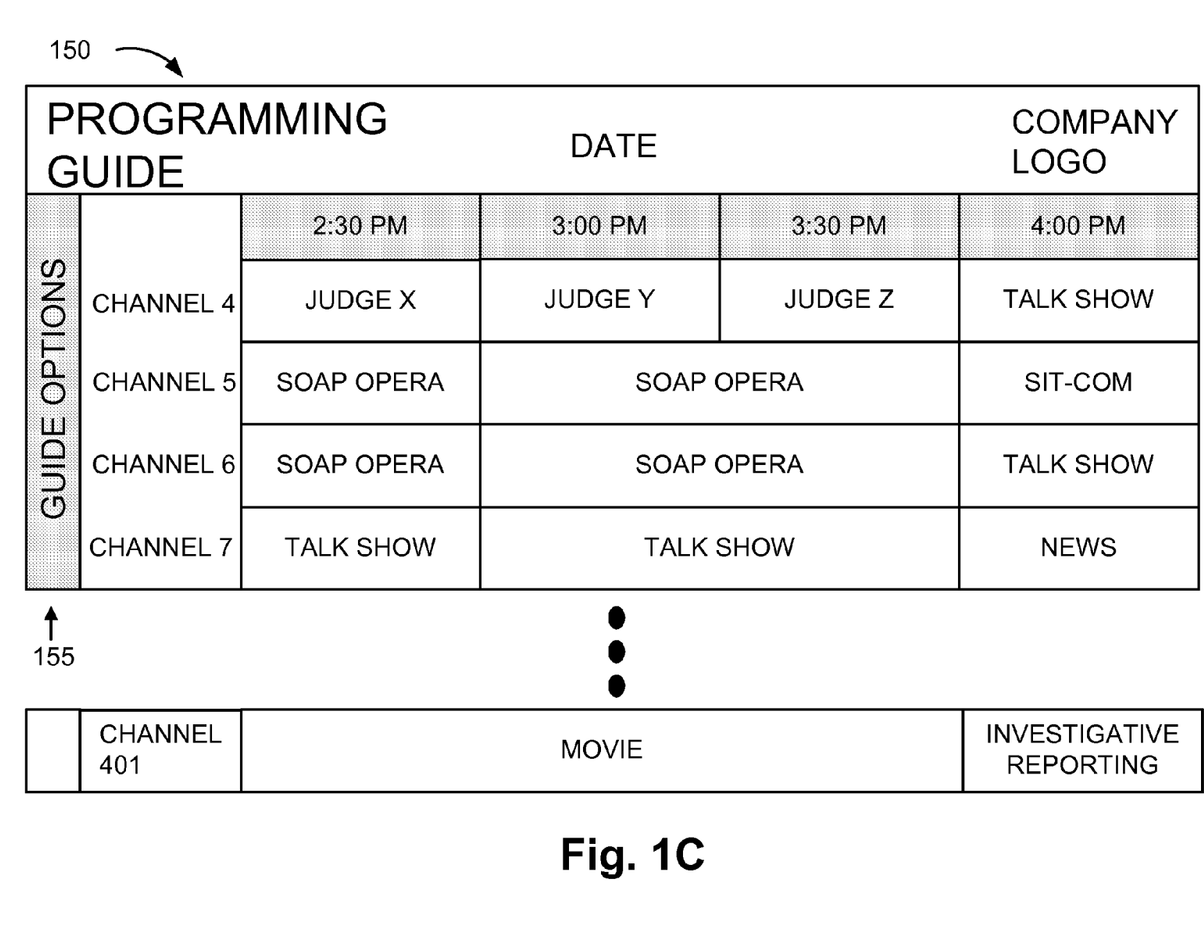
FIG. 1C is a diagram illustrating an exemplary programming guide.

In this example, a user may wish to create a scrolling function. For example, the user may wish to create the scrolling function as it pertains to scrolling when a programming guide is being used, as illustrated in FIG. 1C, or when the user interacts with other screens that include lists (e.g., a list of content pertaining to on-demand service, etc.), or other visual arrangements in which scrolling may be used. The term "programming guide," as used herein, is intended to be broadly interpreted to include a user interface to television content and/or Internet content. For example, the programming guide may correspond to an electronic program guide (EPG), an interactive program guide (IPG), a television guide, or some other type of graphical user interface that assists a user to select content.

Figure 1D:
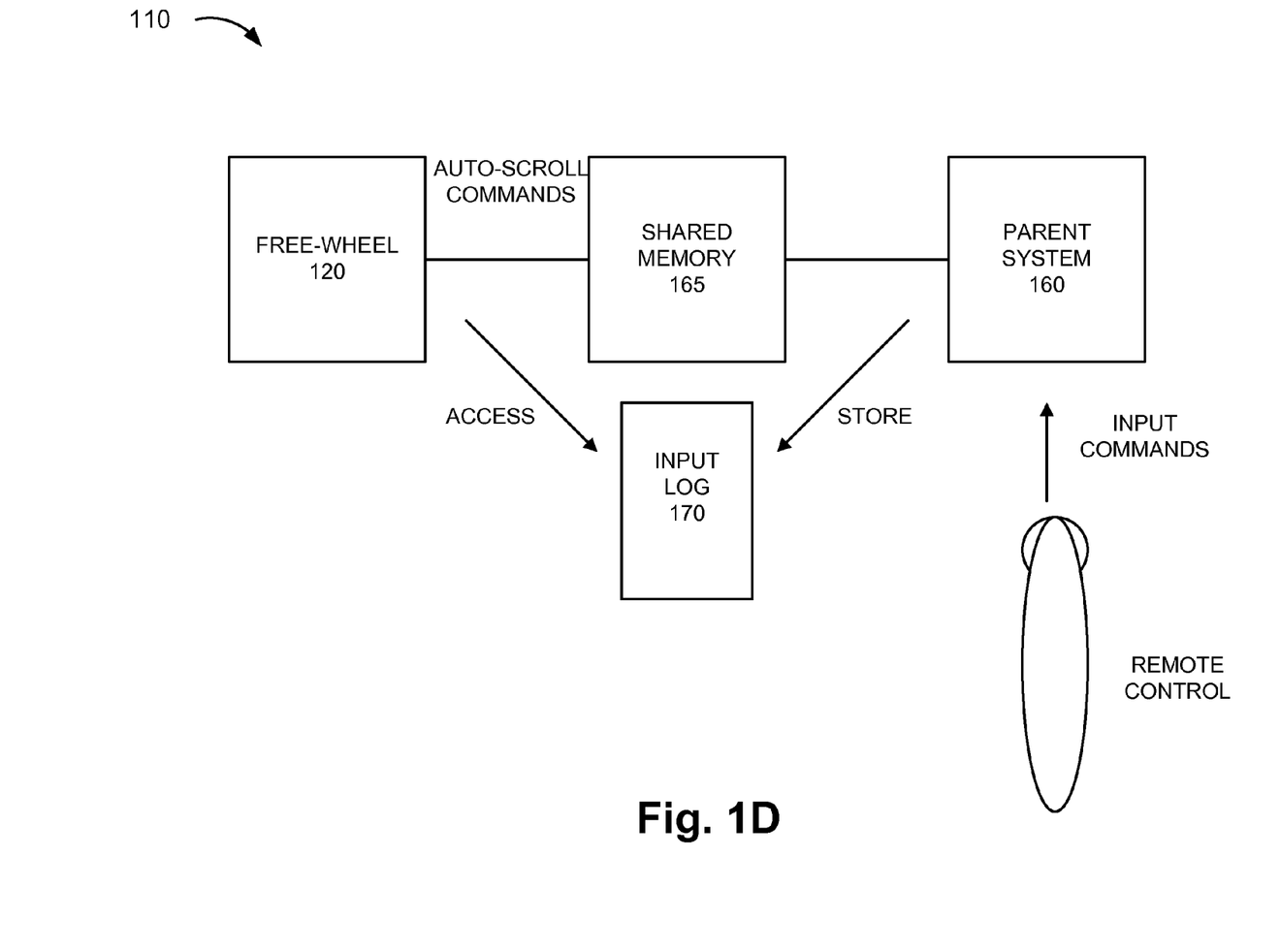
FIG. 1D is a diagram illustrating an exemplary process pertaining to the recordation and execution of a sequence of navigational inputs by the free-wheel system.

In this example, the user may access the guide options menu 155 of programming guide 150 via the remote control. Guide options menu 155 of FIG. 1C may include graphical user interfaces pertaining to free-wheel 120. For example, the user may indicate via one of the graphical user interfaces that he/she wishes to record a sequence of navigational inputs. Thereafter, the user may navigate back to programming guide 150 and enter a series of input commands, via the remote control, that correspond to scrolling. During this process, the set-top box may receive the input commands and execute the input commands. For example, as illustrated in FIG. 1D, a parent system 160 of the set-top box (e.g., a programming guide application, an operating system of the set-top box, etc.) may receive the input commands pertaining to the user's scrolling and execute them. During this process, parent system 160 may store the series of input commands in shared memory 165 as in input log 170. Free-wheel 120 may be triggered to monitor shared memory 165 upon the user's input to begin recording or when making a selection in the guide options menu 155.

During the recording of input commands, the user is able to customize a scrolling function to his/her preferences, such as the speed of the scroll, the direction of the scroll, the range of the scroll (e.g., within a certain channel range, for all channels, the starting point of the scroll (e.g., by channel), within a certain time range (e.g., a 5 hour range for horizontal scrolling), etc.), etc. The user may also record a combination of vertical scrolling and horizontal scrolling. For example, only a certain number of channels in programming guide 150 may be displayed at one time, as well as the time range for those channels. According to an exemplary scenario, the user may wish to scroll through all of the premium channels (e.g., Home Box Office (HBO™) channel and Cinemax™ channel) in a time range of 3 hours (e.g., a time range that exceeds that of a single screen shot of programming guide 150). After the user stops recording (e.g., by pressing a button on the remote control), the user may be prompted to select a (hot)-button (e.g., on the remote control), to allow the user to invoke the automated, customized scrolling function. The hot-button selected by the user may be stored in input log 170.

According to an exemplary embodiment, free-wheel 120 may provide a graphical user interface to allow the user to modify values associated with parameters pertaining to the customized scrolling function. For example, the user may be able to modify values associated with the speed of the scroll, the range of the scroll, the direction, etc., after the recording is stopped. Alternatively, the user may select pre-defined values that may be mapped to or correspond to these parameters. For example, the graphical user interface may permit the user to select a slow, medium, or fast speed for scrolling, a channel range (e.g., by entering channel numbers), direction of scroll, etc. Input log 170 may store any modifications, as set by the user, which pertains to the customized scrolling function.

Thereafter, input log 170 may be used to execute the customized scrolling function. For example, when the user presses the hot-button on the remote control, the input command is sent to parent system 160 and may be stored in shared memory 165. Free-wheel 120 may be monitoring shared memory 165 and recognize that the scrolling function is being invoked by the user. According to an exemplary implementation, free-wheel 120 may access input log 170, and provide the sequence of input commands to parent system 160 via shared memory 165. Parent system 160 may correspondingly execute those input commands. According to an exemplary embodiment, the user may be able to pause or stop the execution at any time during the execution of the customized scrolling function. Upon completion of the execution of the sequence of navigational inputs, manual control may be returned to the user.

Although in the above example, it has been described that free-wheel 120 communicates with parent system 160 via shared memory 165, according to other implementations, depending on parent system 160, free-wheel 120 may communicate with parent system 160 using suitable IPCs, API calls, callback functions, etc., as previously described.

As described above, in this example, free-wheel 120 permits the user to create and use a customized scrolling function, which may be executed by user device 110 in an automated manner. Free-wheel 120 may permit the user to create other types of navigational functions that include a sequence of input commands. For example, it is typically the case that a user may have to navigate through a series of menus to access on-demand content or other types of screens (e.g. content stored by a digital video recorder (DVR), content available on pay-per-view, etc.). According to a process similar to that described above, the user may create and use other types of customized functions that may involve various types of input commands, such as a select command, a cursor command, enter channel number command, etc., to allow the user to navigate from one screen to any other available screen and/or perform a certain function. The term "screen," as used herein, is intended to be broadly interpreted to include a screen, a portion of a screen, an overlay, or some other graphical entity. With reference to functions, the functions may include, for example, a search function (e.g., search for a user's favorite show in the programming guide in conjunction with an auto-scroll), a sign-on function (e.g., that permits the user to go from watching a television program to being signed on to an application (e.g., the application may include YouTube, Netflix, etc.)), a surf function (e.g., that permits the user to navigate back and forth among three or more channels), etc.

According to other embodiments, free-wheel 120 may reside on other types of user devices 110 (e.g., mobile devices, such as an iPad™ device, an Ipod™ device, an iPhone™ device, a Blackberry™ device, a Kindle™ device, an Android™ device, a netbook, and the like; computers (e.g., a laptop, a desktop, a palmtop, a server, etc.); communication devices; location-aware devices (e.g., a Global Positioning System (GPS) device); etc.) to perform similar functions previously described. For example, according to another scenario, assume a user is reading media (e.g., an electronic book (e-book), an article, or other textual media) on user device 110. The user may configure free-wheel 120 to perform an auto-scroll or page-turning function so that each page may be displayed in accordance with the auto-scroll or page-turning function settings. In this way, the user may read material without having to provide an input each time the user finishes reading a page. According to an exemplary embodiment, free-wheel 120 may automatically stop once the end of the book, paper, or article is reached (e.g., page-wise, based on an end-point set by the user, etc.). The user may be able to interrupt the process at any time, change the settings, etc., as previously described elsewhere in this description.

Additionally, free-wheel 120 may permit the user to configure other types of customized navigational or functional commands. For example, various customized navigational sequences may be implemented on user devices 110 (e.g., computers, etc.), as such sequences may pertain to launching an application, opening a file, saving and closing a file, navigating through menus, managing windows (e.g., opening, closing, minimizing, expanding, reducing, moving from one screen to another screen, moving from one area of the screen to another portion of the screen, etc.), opening a folder, closing a folder, searching for a file in a folder or other directory, selecting a file, moving a file from one folder to another folder, performing drag-and-drop, etc. Free-wheel 120 may be configured to execute these sequences when user device 110 is running (e.g., during a start-up of user device 110, after start-up, during a shut-down of user device 110). The user may invoke free-wheel 120 to perform these functions, as well as re-configure parameters associated with the functions, as previously described. Additionally, depending on the function or navigational sequence to be performed, free-wheel 120 may permit the user to set user preferences that pertain to when the function or navigational sequence is to be invoked and/or terminated. For example, the user preferences may relate to a user providing a certain input or a user-specified date, time, day, and/or other scheduling information (e.g., a time period (e.g., from 9 a.m. to 10 a.m.)).

According to an exemplary embodiment, free-wheel 120 may permit the user to configure other types of customized functional commands, as such functions may pertain to other types of user devices 110 (e.g., a facsimile device, a scanner device, a printer device, and/or other business-type devices). For example, according to an exemplary embodiment, free-wheel 120 may take the form of a plug-and-play device. The user may be able to manually carry out a particular task and record the task by, for example, pressing a button on the plug-and-play device or pressing a button on the user device 110 (e.g., selecting an option provided by a user interface of user device 110). Similar to that described above, the user may invoke the customized function based on various triggers (e.g., a user input; date, time, day, and/or other scheduling information; start-up of user device 110, etc.). According to an exemplary embodiment, free-wheel 120 may include a user interface displayable on a light emitting diode (LED) screen of the plug-and-play device or via user device 110. Free-wheel 120 may permit the user to interrupt the execution of the customized function at any time (e.g., to use user device 110 manually), initiate a task at any time, re-record a task, terminate the task based on a trigger, and permit a task to loop, reconfigure parameters, etc.

Figure 2:
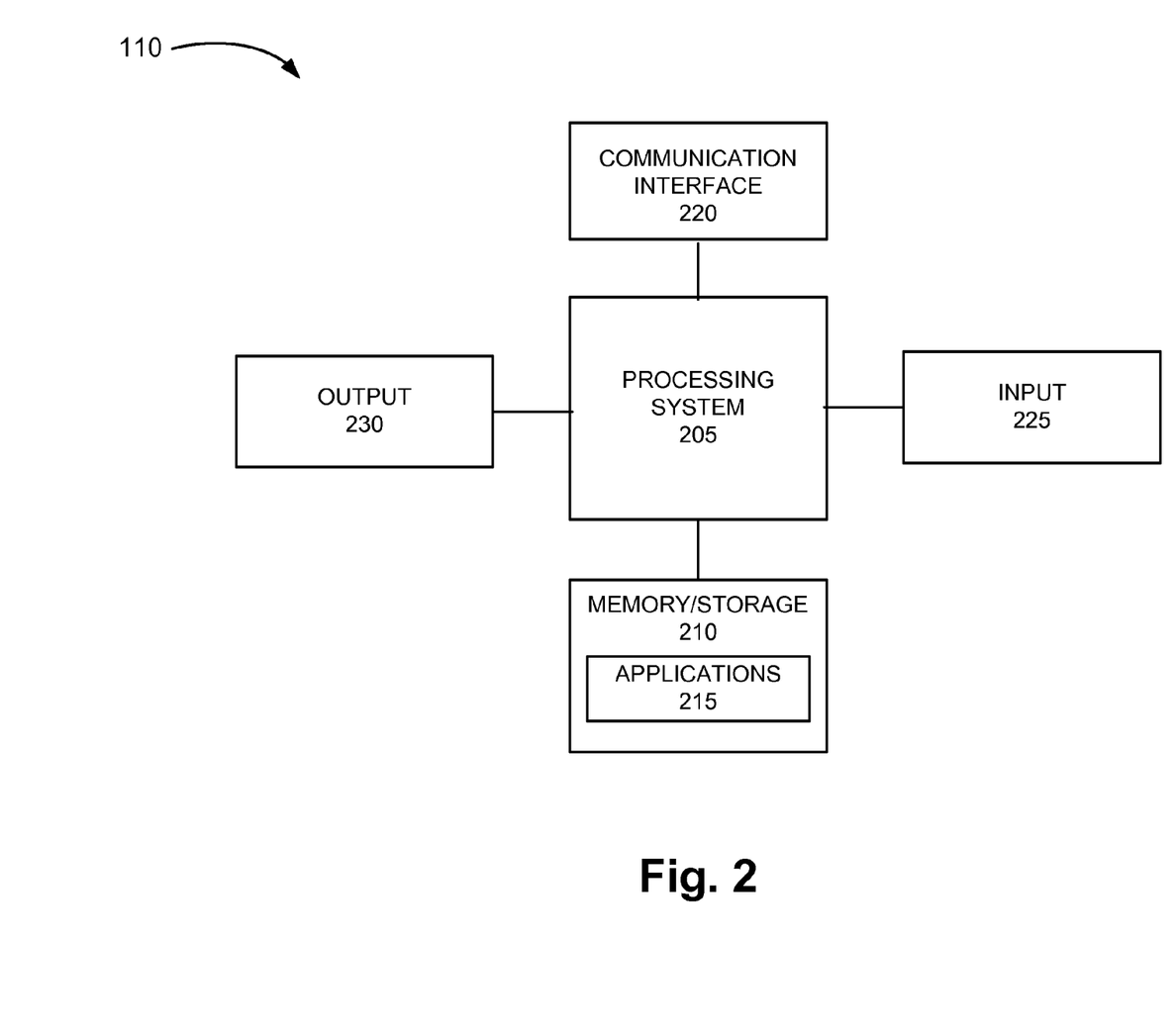
FIG. 2 is a diagram illustrating exemplary components of a user device.

FIG. 2 is a diagram illustrating exemplary components of user device 110. As illustrated, user device 110 may include a processing system 205, memory/storage 210 including applications 215, a communication interface 220, an input 225, and an output 230. According to other implementations, user device 110 may include fewer components, additional components, different components, and/or a different arrangement of components than those illustrated in FIG. 2 and described herein.

Processing system 205 may include one or multiple processors, microprocessors, data processors, co-processors, multi-core processors, application specific integrated circuits (ASICs), controllers, programmable logic devices, chipsets, field programmable gate arrays (FPGAs), system on chips (SoCs), programmable logic devices (PLSs), microcontrollers, application specific instruction-set processors (ASIPs), central processing units (CPUs), or some other component that may interpret and/or execute instructions and/or data. Depending on the type of processing system 205, processing system 205 may be implemented as hardware, or a combination of hardware and software, may include a memory (e.g., memory/storage 210), etc.

Processing system 205 may control the overall operation, or a portion of operation(s) performed by user device 110. Processing system 205 may perform one or multiple operations based on an operating system and/or various applications (e.g., applications 215). Processing system 205 may access instructions from memory/storage 210, from other components of user device 110, and/or from a source external to user device 110 (e.g., another device, a network, etc.).

Memory/storage 210 may include one or multiple memories and/or one or multiple other types of tangible storage mediums. For example, memory/storage 210 may include one or more types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 210 may include a hard disk (e.g., a magnetic disk, an optical disk, a magneto-optic disk, a solid state disk, etc.) and a corresponding drive. Memory/storage 210 may be external to and/or removable from user device 110, such as, for example, a Universal Serial Bus (USB) memory stick, a dongle, a hard disk, mass storage, off-line storage, or some other type of storing medium (e.g., a computer-readable medium, a compact disk (CD), a digital versatile disk (DVD), a Blu-ray™ disc (BD), etc.). Memory/storage 210 may store data, application(s), and/or instructions related to the operation of user device 110.

The term "computer-readable medium," as used herein, is intended to be broadly interpreted to include, for example, a memory, a CD, a DVD, a BD, or another type of tangible storage medium.

Applications 215 may include software that may provide various services or functions. For example, with reference to user device 110, applications 215 may include an application that, when executed by processing system 205, may provide the functions of the free-wheel, as described herein.

Communication interface 220 may permit user device 110 to communicate with other devices, networks, systems and/or the like. Communication interface 220 may include one or multiple wireless interface(s) and/or wired interface(s). Communication interface 220 may include one or multiple transmitter(s) and receiver(s), or transceiver(s).

Input 225 may permit an input into user device 110. For example, input 110 may include a keyboard, a keypad, a touchscreen, a touch pad, a mouse, an input port, a button, a switch, a microphone, a knob, and/or some other type of input.

Output 230 may permit user device 110 to provide an output. For example, output 230 may include a display, a speaker, a light (e.g., light emitting diode(s), etc.), an output port, a vibratory mechanism, and/or some other type of output.

User device 110 may perform operation(s) and/or process(es) in response to processing system 205 executing software instructions stored by memory/storage 210. For example, the software instructions may be read into memory/storage 210 from another memory/storage 210 or from another device via communication interface 220. The software instructions stored in memory/storage 210 may cause processing system 205 to perform processes described herein. Alternatively, according to another implementation, user device 110 may perform processes based on the execution of hardware (e.g., processing system 205, etc.), the execution of hardware and firmware, or the execution of hardware, software (e.g., applications 215), and firmware.

Figure 3:
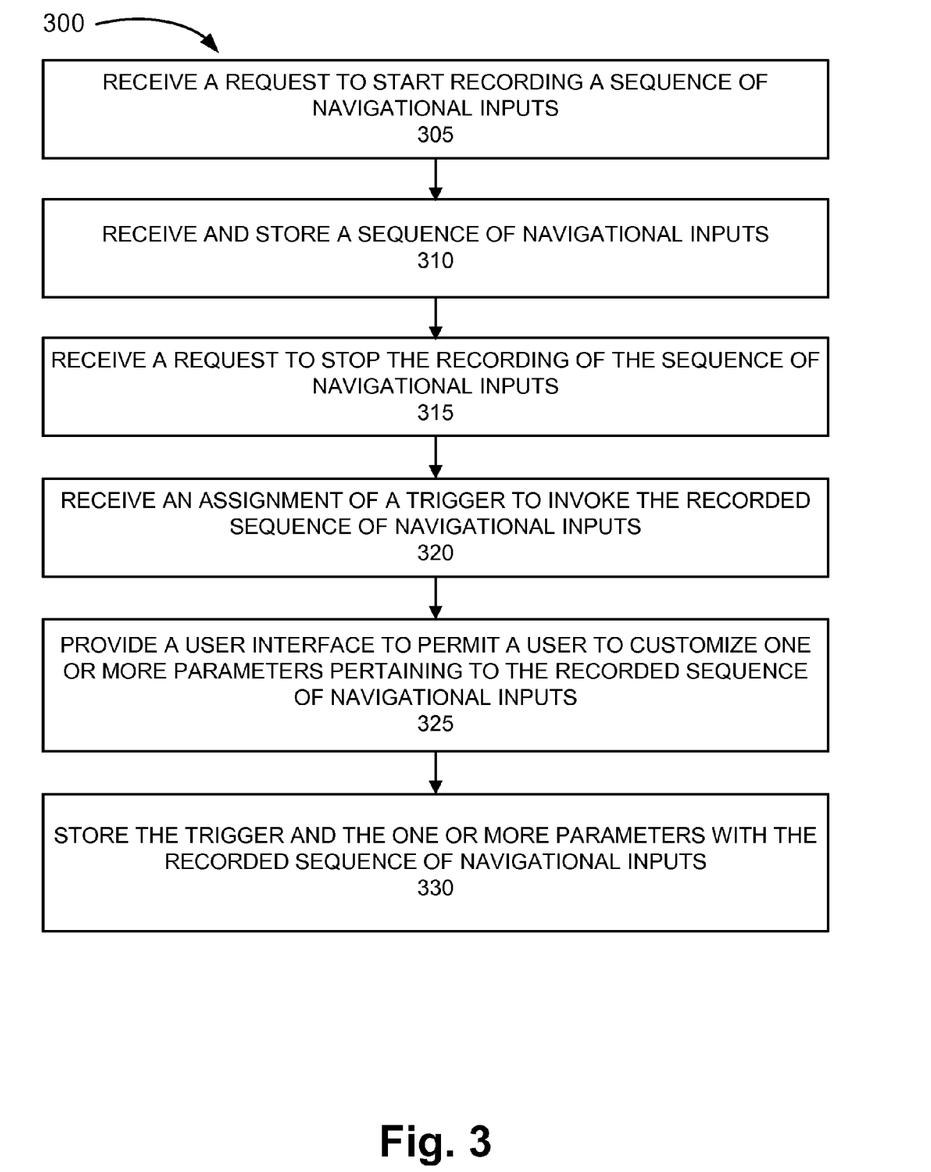
FIG. 3 is a flow diagram illustrating an exemplary process for creating an automated, customized navigational input sequence.

FIG. 3 is a flow diagram illustrating an exemplary process for creating an automated, customized navigational input sequence. According to an exemplary embodiment, one or more operations of process 300 may be performed by free-wheel 120 or in conjunction with user device 110.

Process 300 may include receiving a request to start recording a sequence of navigational inputs (block 305). For example, as previously described, a user may indicate, via an input of user device 110, that he/she wishes to start recording a sequence of navigational inputs. Free-wheel 120 may recognize that a sequence of navigational inputs is to be recorded based on monitoring the input(s) received by user device 110 (e.g., at an application level, operating system level, etc.), monitoring a shared memory that may store the input(s), or calls/interfaces that may be available between free-wheel 120 and the parent system.

A sequence of navigational inputs may be received and stored (block 310). For example, as previously described, user device 110 may receive the sequence of navigational inputs manually performed by the user. User device 110 or free-wheel 120 may store this sequence into a memory. For example, according to an exemplary implementation, the memory may be a shared memory (i.e., between free-wheel 120 and the parent system of user device 110). According to another implementation, free-wheel 120 may obtain the sequence information from the parent system based on calls/interfaces that may be available.

A request to stop the recording of the sequence of navigational inputs may be received (block 315). For example, as previously described, the user may indicate, via an input of user device 110, that he/she wishes to stop recording the sequence of navigational inputs. Free-wheel 120 may recognize that the recording of the sequence of navigational inputs has ended based on monitoring the input(s) received.

An assignment of a trigger to invoke the recorded sequence of navigational inputs may be received (block 320). For example, as previously described, a trigger to invoke the recorded sequence of navigational inputs may be received from the user. As an example, the user may assign a button; a date, day, time, and/or scheduling information; looping information, etc. This trigger information may be received by free-wheel 120 and stored with the sequence of navigational input information (e.g., in a log stored in a memory).

A user interface may be provided to permit a user to customize one or more parameters pertaining to the recorded sequence of navigational inputs (block 325). For example, as previously described, free-wheel 120 may provide a user interface that permits the user to customize parameters pertaining to the recorded sequence of navigational inputs. By way of example and with reference to a scrolling function, free-wheel 120 may provide one or more values pertaining to the speed of the scroll based on recorded navigational input information. For example, a time between receiving a first input to scroll and a second input to scroll may indicate a speed of the scroll. According to an exemplary embodiment, when the times between one set of multiple inputs and another set of multiple inputs are different, free-wheel 120 may average the time values. Additionally, or alternatively, free-wheel 120 may map these time values to more user-friendly representations, such as, very slow, slow, medium, fast, etc. These user-friendly mappings may be provided to the user for selection in the user interface. Free-wheel 120 may perform similar operations pertaining to other parameters that pertain to a particular sequence of navigational inputs.

The trigger and the one or more parameters may be stored with the recorded sequence of navigational inputs (block 330). For example, as previously described, the trigger information and the customized parameter(s) may be stored with the sequence of navigational input information.

Although FIG. 3 illustrates an exemplary process 300, according to other implementations, process 300 may include additional operations, fewer operations, and/or different operations than those illustrated in FIG. 3 and described herein.

Figure 4:
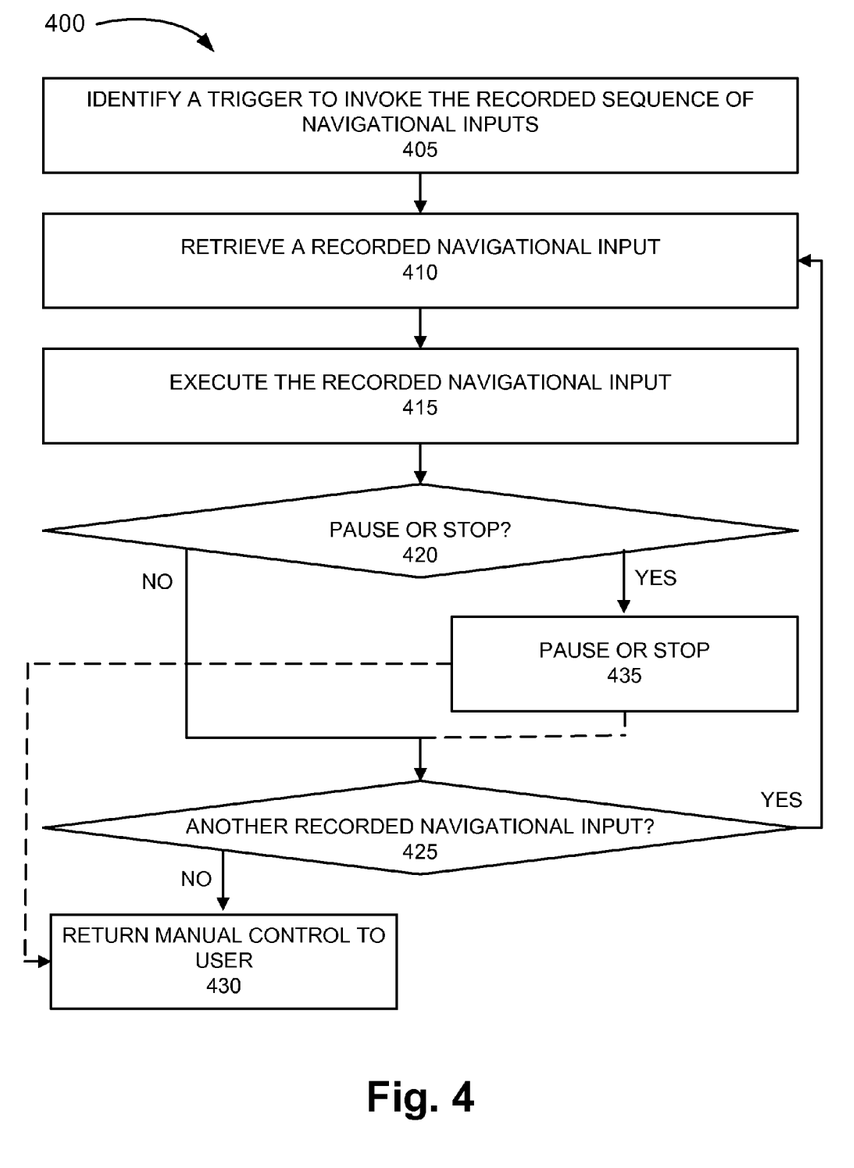
FIG. 4 is a diagram illustrating an exemplary process for invoking and executing the recorded sequence of navigational inputs.

FIG. 4 is a diagram illustrating an exemplary process for invoking and executing the recorded sequence of navigational inputs previously described in process 300. According to an exemplary embodiment, one or more operations of process 300 may be performed by free-wheel 120 or in conjunction with user device 110.

Process 400 may include identifying a trigger to invoke the recorded sequence of navigational inputs (block 405). For example, as previously described, according to an exemplary implementation, user device 110 may receive a user's input (e.g., user may press a hot button) that invokes an execution of the recorded sequence of navigational inputs. According to other implementations, the trigger may be event-based (e.g., date, day, time, or other scheduling information; a device-event (e.g., upon start-up of user device 110, etc.), etc.). Upon receipt or upon the occurrence of the trigger, free-wheel 120 may identify the input or the event as a trigger to invoke the recorded sequence of navigational inputs.

The recorded navigational input may be retrieved (block 410). For example, as previously described, the recorded sequence of navigational inputs may be stored in a memory. According to an exemplary embodiment, the memory may be a shared memory between free-wheel 120 and the parent system of user device 110. According to other embodiments, communication between free-wheel 120 and the parent system of user device 110 may not be via a shared memory, but via calls/interfaces, etc., as previously described. Based on the receipt or the occurrence of the trigger, free-wheel 120 may retrieve from the memory each navigational input of the recorded sequence. Additionally, if any parameters were subsequently changed (e.g., the user customized a parameter), free-wheel 120 may also retrieve this type of information.

The recorded navigational input may be executed (block 415). For example, as previously described, free-wheel 120 may provide each navigational input to the parent system for execution either via the shared memory or via API calls, etc. The parent system of user device 110 may then execute the navigational command.

It may be determined whether the execution should be paused or stopped (block 420). For example, as previously described, the user may pause or stop the execution of a navigational input. Free-wheel 120 and/or the parent system of user device 110 may continually monitor for a user input that may pause or stop the execution or monitor for the occurrence of some event which may pause or stop the execution. If it is determined that the execution of the navigational input should be paused or stopped (block 420—YES), the execution may be stopped or paused (block 435). Depending on whether the execution is paused or stopped and/or subsequent input or event, process 400 may continue, as indicated by the dotted lines, to execute the sequence and continue to block 425 or the execution may be stopped and process 400 may continue to block 430, in which manual control is returned to the user. If it is determined that the execution should not be paused or stopped (block 420—NO), upon completion of the execution of the navigational input, it may be determined whether another recorded navigational input pertaining to the sequence exists (block 425). For example, the recorded sequence may be stored in a memory and free-wheel 120 may determine whether a subsequent navigational input needs to be executed. If it is determined that another recorded navigational input does not need to be executed (block 425—NO), the execution of the sequence may be deemed complete and manual control of user device 110 may be returned to the user (block 430). However, if it is determined that another recorded navigational input needs to be executed (block 425—YES), process 400 may continue to block 410 in which the next navigational input may be retrieved for execution.

Although FIG. 4 illustrates an exemplary process 400, according to other implementations, process 400 may include additional operations, fewer operations, and/or different operations than those illustrated in FIG. 4 and described herein.

According to another exemplary embodiment, free-wheel 120 may provide an interactive virtual user that operates a user's user device 110. For example, the interactive virtual user may instruct a user with respect to the operation of user device 110. In contrast to existing approaches, in which the user may watch an instructional video or read a manual to learn how to operate user device 110, free-wheel 120 may provide the information/instruction to the user by automating the user's user device 110. The virtual user may be interactive in that the user may start, stop, pause, re-play, loop, etc., any step performed by the virtual user. An example of the interactive virtual user is described below in the context of a user exploring a new service provided by his/her television service provider.

Figure 5:
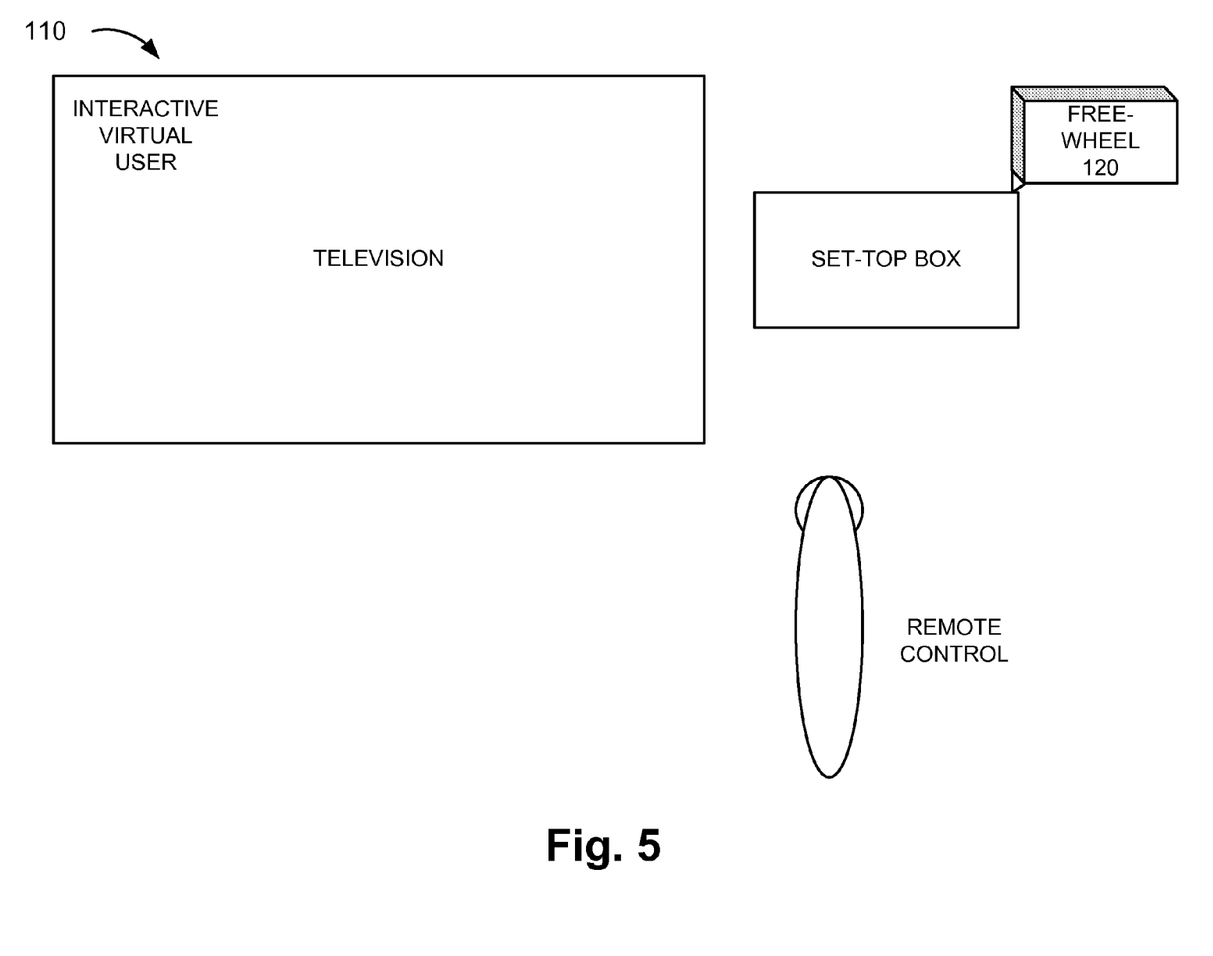
FIG. 5 is a diagram illustrating an exemplary user device that includes the free-wheel system.

FIG. 5 is a diagram illustrating user devices 110 including a television, a set-top box, and a remote control. In this example, it may be assumed that the user is interested in learning more about a new service that is being advertised by his/her television service provider. The user may access a portal screen that includes various icons representative of various applications. The user may see a new icon entitled "New Service." The user may select the icon, via the remote control. Subsequently, the user may be prompted, on the television, whether he or she would like to be introduced to the new service using the interactive virtual user. In this example, the user accepts.

Free-wheel 120 may then launch and navigate through the different parts of the new feature, which is displayed to the user on the television. In this way, the user is able to come to understand the new service based on the operation of his/her user device(s) 110, including, for example, the exact screens he/she will see when using the new service on his/her user device(s) 110. According to an exemplary embodiment, the user may be able to pause, stop, and replay the navigation at any point.

According to an exemplary implementation, free-wheel 120 may cause each button of the remote control to light, as if the user is pressing the appropriate button. Additionally, or alternatively, an image of the remote control may be displayed on the television that indicates the buttons pressed during the course of the navigation. A flow diagram similar to that illustrated and described with respect to FIG. 4 may explain an exemplary process pertaining to the interactive virtual user. However, in this case, a sequence of navigational inputs is not based on a recording of the user's input. Rather, the sequence may be a series of navigational inputs that are pre-configured by the television service provider in the form of, for example, a script, an application, an applet, or a log stored in a memory. Free-wheel 120 may cause the sequence of the interactive virtual user to be executed.

The foregoing description of implementations provides illustration, but is not intended to be exhaustive or to limit the implementations to the precise form disclosed. Accordingly, modifications to the implementations described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks are described with regard to the processes illustrated in FIGS. 3 and 4, the order of the blocks may be modified in other implementations. Further, non-dependent blocks may be performed in parallel. Additionally, with respect to other processes described in this description, the order of operations may be different according to other implementations, and/or operations may be performed in parallel.

The embodiments described herein may be implemented in many different forms of software and/or firmware executed by hardware. For example, a process or a function may be implemented as "logic" or as a "component." The logic or the component may include, for example, hardware (e.g., processing system 205, etc.), a combination of hardware and software (e.g., applications 215), a combination of hardware and firmware, or a combination of hardware, software, and firmware. The implementation of software or firmware has been described without reference to the specific software code since software can be designed to implement the embodiments based on the description herein. Additionally, a computer-readable medium may store instructions, which when executed, may perform processes and/or functions pertaining to the exemplary embodiments described herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

No element, act, operation, or instruction described in the present application should be construed as critical or essential to the embodiments described herein unless explicitly described as such.

What is claimed is:

1. A method comprising:
   receiving a request to start recording a sequence of navigational inputs to be received by a user device;
   storing each navigational input of the sequence when each navigational input is received;
   receiving a request to stop recording the sequence of navigational inputs;
   stopping the recording of the sequence of navigational inputs;
   receiving an assignment of a trigger to invoke an execution of the recorded sequence of navigational inputs;
   storing the assignment of the trigger;
   providing a user interface that permits a user to edit recorded values of parameters pertaining to the recorded sequence of navigational inputs, wherein the providing comprises:
      determining whether a set of recorded values pertaining to a type of navigational input are different than another set of recorded values pertaining to the type of navigational input that occur during the sequence of navigational inputs;
      averaging the set of recorded values with the other set of recorded values in response to determining that the set of recorded values are different than the other set of recorded values;
      mapping an averaged set of recorded values to one or more default values, wherein the mapping includes mapping the averaged set of recorded values to corresponding text indicative of the one or more default values; and
      providing, via the user interface, the text that corresponds to the one or more default values for selection by the user;
   identifying when the trigger is received or occurs; and
   executing the recorded sequence of navigational inputs on the user device based on the identifying.

2. The method of claim 1, wherein the sequence of navigational inputs pertain to navigation through user interfaces of a television service, and wherein the user device includes a set top box.

3. The method of claim 1, wherein the recorded sequence of navigational inputs is a scrolling function.

4. The method of claim 1, wherein the executing of the recorded sequence of navigational inputs causes an automated navigation via one or more user interfaces of the user device, and wherein each navigational input is stored in a memory shared between the user device and another system, and the method further comprising:
   providing, by the other system, the sequence of navigational inputs to the user device via the memory shared between the user device and the other system, wherein the other system includes a Universal Serial Bus stick having plug-and-play capabilities.

5. The method of claim 1, wherein the trigger is a user input or an event including one of a time-based event or a user device-based event.

6. The method of claim 1, further comprising:
   pausing or stopping an execution of the recorded sequence of navigational inputs based on receiving a user input.

7. The method of claim 1, further comprising:
   returning manual control of the user device to the user when an execution of the recorded sequence of navigational inputs is completed.

8. The method of claim 1, wherein the recorded sequence of navigational inputs is scrolling within one of a programming guide, an electronic book, or an article, and the scrolling includes at least one of vertical scrolling or horizontal scrolling.

9. A device comprising:
   one or more memories to store instructions; and
   one or more processing systems, wherein the one or more processing systems execute the instructions to:
      recognize a start request to start recording a sequence of navigational inputs when the start request is received;
      store each navigational input of the sequence during a recording when the start request is received;
      recognize a stop request to stop recording the sequence of navigational inputs when the stop request is received;
      stop recording when the stop request is received;
      recognize an assignment of a trigger to invoke an execution of a recorded sequence of navigational inputs when the assignment of the trigger is received;
      store the trigger;
      provide a user interface that permits a user to edit recorded values of parameters pertaining to the recorded sequence of navigational inputs, wherein to provide the user interface, the one or more processing systems execute the instructions to:
         determine whether a set of recorded values pertaining to a type of navigational input are different than another set of recorded values pertaining to the type of navigational input that occur during the sequence of navigational inputs;
         average the set of recorded values with the other set of recorded values in response to a determination that the set of recorded values are different than the other set of recorded values;
         map an averaged set of recorded values to one or more default values, wherein a mapping includes mapping the averaged set of recorded values to corresponding text indicative of the one or more default values, and wherein the user interface includes the text corresponding to the one or more default values for selection by the user;
recognize the trigger to execute the recorded sequence of navigational inputs when the trigger is received or occurs; and
execute the recorded sequence of navigational inputs on the device when the trigger is received or occurs.

10. The device of claim 9, wherein the sequence of navigational inputs includes a series of scrolls.

11. The device of claim 9,
wherein the sequence of navigational inputs pertain to navigation through user interfaces of a television service, and wherein the text includes one or more of slow, medium, or fast.

12. The device of claim 9, wherein the device is one of a set-top box, a computer, or a mobile communication device.

13. The device of claim 9, wherein the sequence of navigational inputs includes a cursor input and a selection input.

14. The device of claim 9, wherein the trigger is a user input or an event including one of a time-based event or a device-based event.

15. The device of claim 9, wherein the one or more processing systems executes the instructions to:
pause or stop an execution of the recorded sequence of navigational inputs based on receiving a user input.

16. A non-transitory computer-readable medium comprising instructions for:
storing a sequence of navigational inputs input by a user of a device;
storing an assignment of a trigger to invoke an execution of the stored sequence of navigational inputs;
providing a user interface that permits the user to edit recorded values of parameters pertaining to the recorded sequence of navigational inputs, wherein the providing comprises:
determining whether a set of recorded values pertaining to a type of navigational input are different than another set of recorded values pertaining to the type of navigational input that occur during the sequence of navigational inputs;
averaging the set of recorded values with the other set of recorded values in response to determining that the set of recorded values are different than the other set of recorded values;
mapping an averaged set of recorded values to one or more default values, wherein the mapping includes mapping the averaged set of recorded values to corresponding text indicative of the one or more default values; and
providing, via the user interface, the one or more default values for selection by the user, wherein the text corresponds to the one or more default values;
executing the sequence of navigational inputs when the trigger is received or occurs, wherein an execution of the sequence of navigational inputs provides an automated navigation through one or more user interfaces of the device;
pausing or stopping an execution of the sequence of navigational inputs when a pause request or a stop request is received; and
halting the execution of the sequence of navigational inputs when the sequence of navigational inputs is completed.

17. The non-transitory computer-readable medium of claim 16,
wherein the text includes one or more of slow, medium, or fast.

18. The non-transitory computer-readable medium of claim 16, wherein the sequence of navigational inputs includes a scrolling input and a selection input, and
wherein the assignment of the trigger is a button of a remote control that operates a set top box associated with a television service.

19. The non-transitory computer-readable medium of claim 16, wherein the recorded sequence of navigational inputs is scrolling within one of a programming guide, an electronic book, or an article, and the scrolling includes at least one of vertical scrolling or horizontal scrolling.

20. The non-transitory computer-readable medium of claim 16, wherein the executing comprises instructions for:
providing the sequence of navigational inputs for execution using application programming interface calls.

21. The non-transitory computer-readable medium of claim 16, wherein the storing the sequence of navigational inputs comprises instructions for:
storing the sequence of navigational inputs in a shared memory.

22. The non-transitory computer-readable medium of claim 16, wherein the sequence of navigational inputs includes input to navigate through an electronic programming guide associated with a television service.

\* \* \* \* \*